US007490640B2

(12) United States Patent
Hege

(10) Patent No.: US 7,490,640 B2

(45) Date of Patent: Feb. 17, 2009

(54) WOODTURNING TOOL

(75) Inventor: Roland E. Hege, Harrisburg, NC (US)

(73) Assignee: University of North Carolina at Charlotte, Charlotte, NC (US)

( * ) Notice: Subject to any disclaimer, the term of this patent is extended or adjusted under 35 U.S.C. 154(b) by 319 days.

(21) Appl. No.: 11/534,296

(22) Filed: Sep. 22, 2006

(65) Prior Publication Data

US 2007/0289672 A1 Dec. 20, 2007

Related U.S. Application Data

(60) Provisional application No. 60/811,124, filed on Jun. 6, 2006.

(51) Int. Cl.
*B23B 27/00* (2006.01)
*B23B 5/00* (2006.01)

(52) U.S. Cl. ................................ 142/56; 142/42; 82/82

(58) Field of Classification Search .................. 142/42, 142/56, 1; 82/128, 82
See application file for complete search history.

(56) References Cited

U.S. PATENT DOCUMENTS

| | | | | | |
|---|---|---|---|---|---|
| 846,272 | A | * | 3/1907 | Whipple et al. | 142/56 |
| 2,764,187 | A | * | 9/1956 | Zemrowski | 142/56 |
| 2,848,020 | A | * | 8/1958 | Zemrowski | 142/56 |
| 3,298,405 | A | | 1/1967 | Loof | |
| 4,372,356 | A | * | 2/1983 | Conklin | 142/56 |
| 5,224,529 | A | * | 7/1993 | Kenny | 142/42 |
| 5,839,333 | A | | 11/1998 | McKay | |
| 5,992,482 | A | | 11/1999 | Voisey | |
| 7,032,633 | B2 | | 4/2006 | Clay | |

* cited by examiner

*Primary Examiner*—Willmon Fridie
(74) *Attorney, Agent, or Firm*—Hammer & Associates, P.C.

(57) ABSTRACT

A woodturning tool for creating containers has a first rigid arm, and a second rigid arm. The first rigid arm has two ends with a cutting blade at the first end. The second rigid arm has two ends with a guiding device at the first end. The cutting blade and the guiding device are operatively aligned. The first and second rigid arms are adapted to move relative to one another.

20 Claims, 4 Drawing Sheets

WOODTURNING TOOL

RELATED APPLICATION

This application claims the benefit of U.S. Provisional application Ser. No. 60/811,124 filed Jun. 6, 2006.

FIELD OF INVENTION

The instant application relates to woodturning tools for creating wood containers.

BACKGROUND OF THE INVENTION

Woodturning is a form of woodworking that is used to create wooden objects (e.g. a bowl or a table leg) on a lathe using cutting tools. Woodturning differs from most other forms of woodworking in that the wood is moving while a relatively stationary tool is used to cut and shape the wood. Many intricate shapes and designs can be made by turning wood or woodturning.

Despite the advances in technology for manufacturing wood products, hand turned products are more highly valued and sought after than mass-produced products. This creates a high demand for hand turned products. Also, woodturning products by hand is a hobby enjoyed by many. Accordingly, there is a need for tools for creating hand turned products.

One area of hand turned products is hand turned containers. Hand turned containers include, but are not limited to, bowls, platters, cups, goblets, dishes, plates, saucers, pots, tumblers, teacups, tasters, etc.

There are many problems and difficulties with creating a hand turned container. These problems may include: creating a uniform or controlled wall thickness, the strength of the walls, the aesthetic appearance of a hand turned container, the time it takes to create a hand turned product, the amount of skill required, and the amount of time it takes to cure a hand turned product.

Accordingly, there is a need for a woodturning tool for creating hand turned containers that addresses all of these problems.

SUMMARY OF THE INVENTION

The instant invention is a woodturning tool for creating containers. The woodturning tool has a first rigid arm, and a second rigid arm. The first rigid arm has two ends with a cutting blade at the first end. The second rigid arm has two ends with a guiding device at the first end. The cutting blade and the guiding device are operatively aligned. The first and second rigid arms are adapted to move relative to one another.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
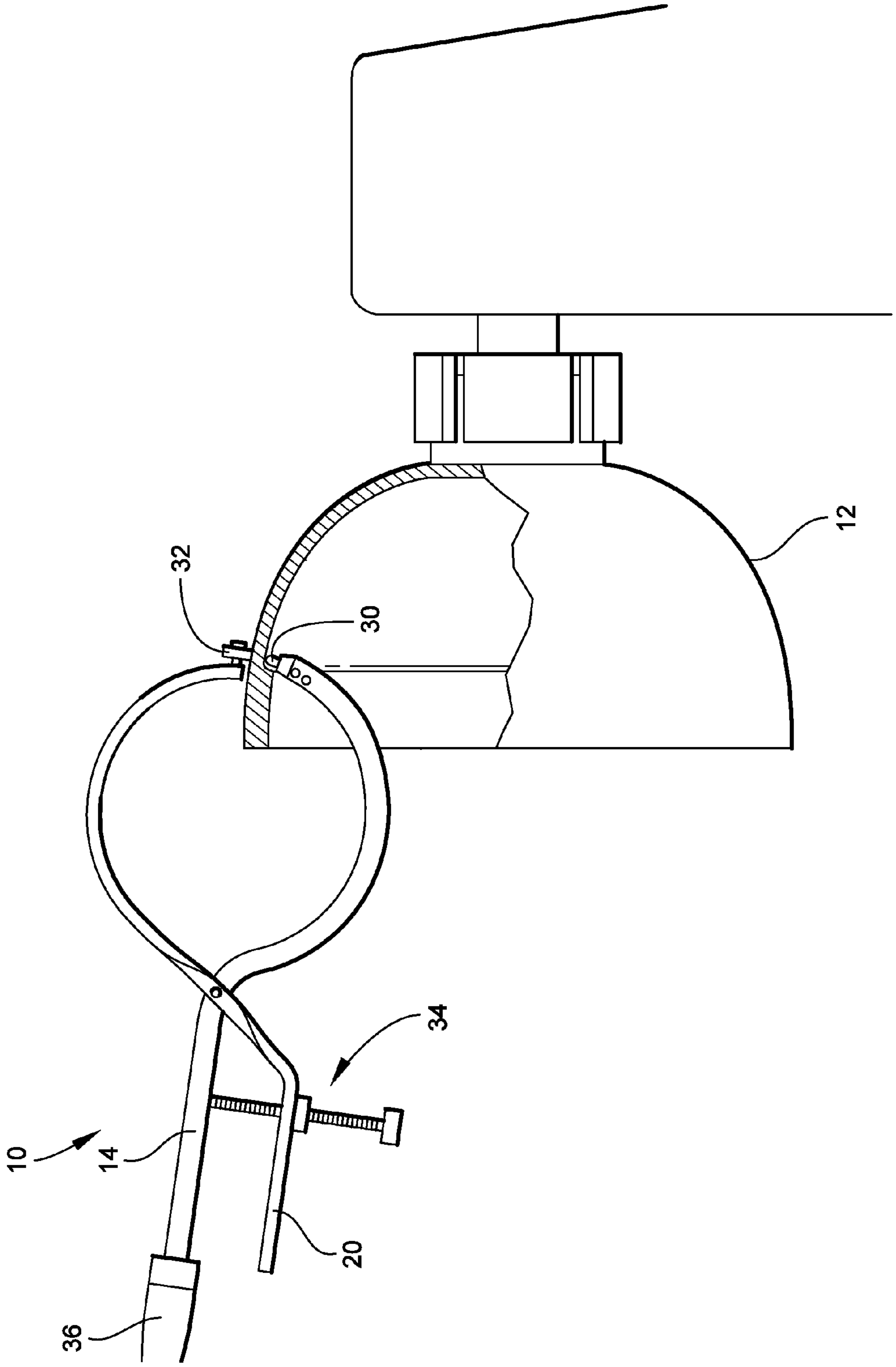
FIG. 1 is an environmental view of one embodiment of the wood turning tool.

Referring to the drawings, wherein like numerals indicate like elements, there is shown in FIG. 1 an embodiment of a woodturning tool 10. Woodturning tool 10 may be a tool used in woodturning. Woodturning tool 10 is especially suited for, but is not limited to, creating a container 12. Woodturning tool 10 may include a first rigid arm 14, a second rigid arm 20, an adjustable width device 34, and a handle 36.

Container 12 may be created using woodturning tool 10. Container 12 may be any container, including, but not limited to, bowls (see FIG. 1), platters, cups, goblets (see FIG. 4), dishes, plates, saucers, pots, tumblers, teacups, tasters, etc. Container 12 may be a hand turned container.

First rigid arm 14 may be included on woodturning tool 10 (see FIG. 1). First rigid arm 14 may be for providing a rigid arm for holding a cutting blade 30. First rigid arm 14 may have two ends with cutting blade 30 attached to first end 16 (see FIG. 3). First rigid arm 14 may be adapted to move relative to second rigid arm 20. First rigid arm 14 may be pivotally connected at a first point 26 to second rigid arm 20. First rigid arm 14 may have a circular cross section. First rigid arm 14 may include a first clearance distance 46. First rigid arm 14 may be a single member arm.

Cutting blade 30 may be attached to first end of first rigid arm 16 (see FIG. 1). Cutting blade 30 may be for providing a cutting blade for cutting the inside walls of container 12. Cutting blade 30 may be any wood turning cutting blade, including, but not limited to, a high speed quarter (¼) inch tool bit. Cutting blade 30 may be aligned with the longitudinal axis of woodturning tool 10 to reduce torsional forces on woodturning tool 10.

Figure 3:
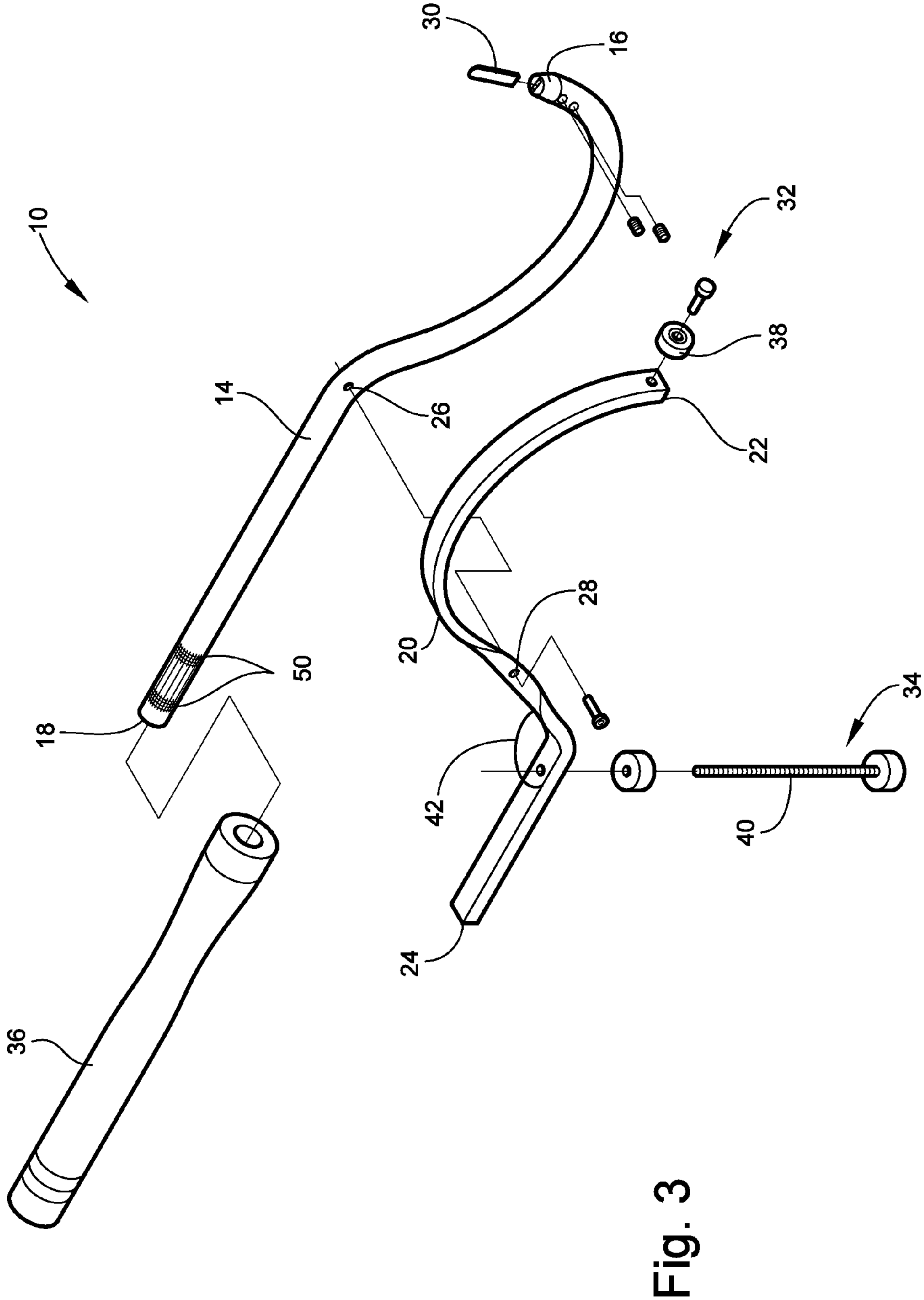
FIG. 3 is a fragmentary view of one embodiment of the wood turning tool.

First point 26 may be located on first rigid arm 14 (see FIG. 3). First point 26 may be any location on first rigid arm 14 where second rigid arm 20 may be pivotally connected. First point 26 may be located between the two ends of first rigid arm 14.

Figure 2:
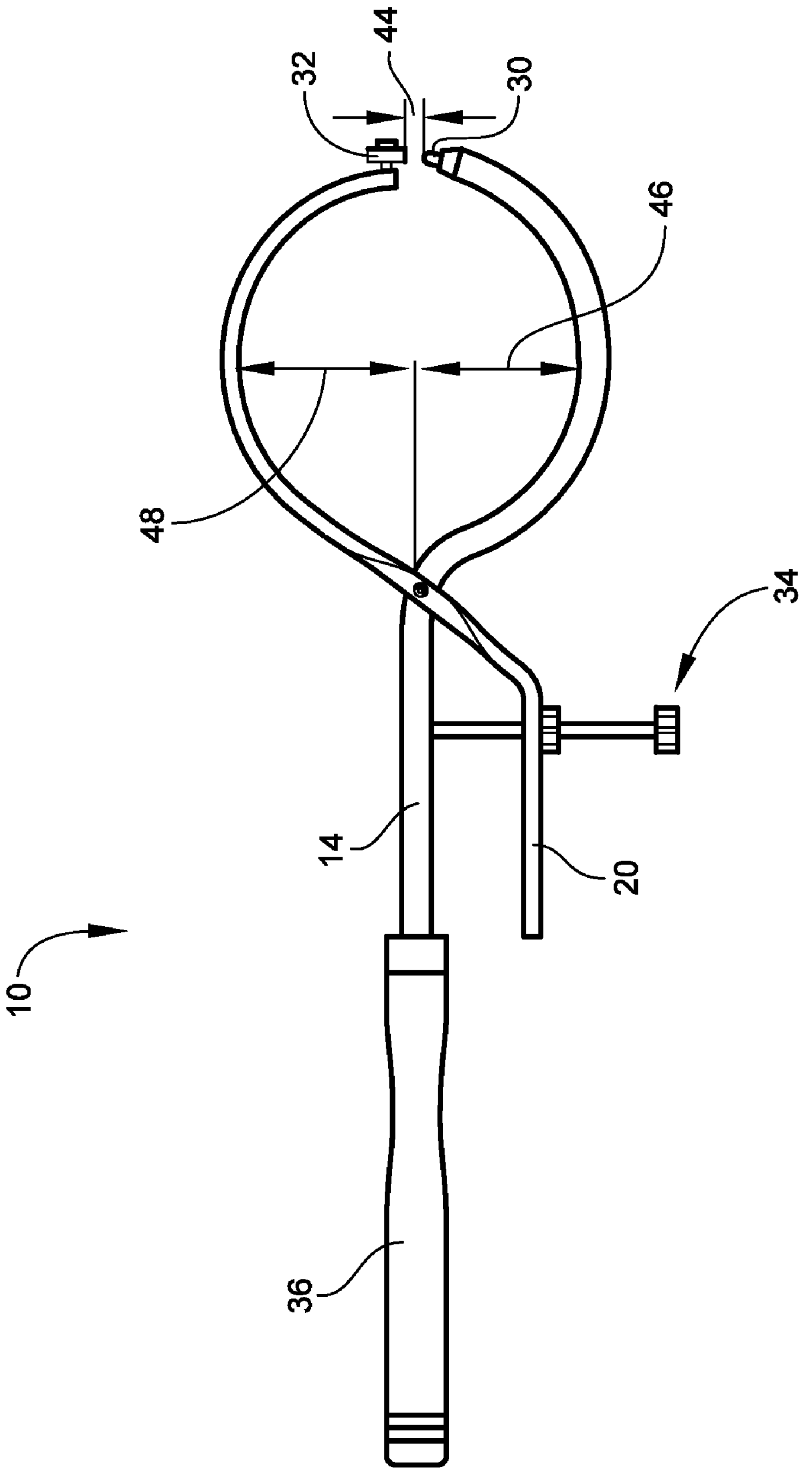
FIG. 2 is a plan view of one embodiment of the wood turning tool.

First clearance distance 46 may be included in first rigid arm 14 (see FIG. 2). First clearance distance 46 may be any distance. First clearance distance 46 may be for allowing the necessary clearance to insert and maneuver first rigid arm 14 to allow cutting blade 30 to cut the inner walls of container 12. First clearance distance 46 may be the radius from approximately first point 26 to first end of first rigid arm 16.

Second rigid arm 20 may be included on woodturning tool 10 (see FIG. 1). Second rigid arm 20 may be for providing a rigid arm for holding a guiding device 32. Second rigid arm 20 may have two ends with guiding device 32 attached to first end 22 (see FIG. 3). Second rigid arm 20 may be adapted to move relative to first rigid arm 14. Second rigid arm 20 may be pivotally connected at a second point 28 to first rigid arm 14. Second rigid arm 20 may have a rectangular cross section second rigid arm 20 may include an angle 42, and a second clearance distance 48. Second rigid arm 20 may be a single arm member.

Guiding device 32 may be attached to first end of second rigid arm 22 (see FIG. 3). Guiding device 32 may be for providing a device for guiding first end of second rigid arm 22 over the outside surface of container 12. Guiding device 32 may be any device capable of guiding first end of second rigid arm 22 over the outside surface of hand container 12, including, but not limited to, a roller bearing 38.

Guiding device 32 and cutting blade 30 may be operatively aligned. Guiding device 32 and cutting blade 32 being operatively aligned may allow for guiding device 32 to guide over the outer walls of container 12 at the same point where cutting blade 32 may be cutting the inner walls of container 12 (see FIGS. 1 and 4). Guiding device 32 and cutting blade 30 being operatively aligned may allow woodturning tool 10 to create different curves and shapes of hand turned containers with uniform or controlled wall thicknesses.

Second point 28 may be located on second rigid arm 20 (see FIG. 3). Second point 28 may be any location on second rigid arm 20 where first rigid arm 14 may be pivotally connected. Second point 28 may be located between the two ends of second rigid arm 20.

First rigid arm 14 and second rigid arm 20 may move relative to one another by any means. This relative movement may allow the distance between cutting blade 30 and guiding device 32 to be adjusted. For example, first rigid arm 14 and second rigid arm 20 may move relative to one another by being pivotally connected at first point 26 and second point 28.

Adjustable width device 34 may be included in woodturning tool 10 (see FIG. 1). Adjustable width device 34 may be for controlling the width between cutting blade 30 and guiding device 32. Adjustable width device 34 may be any device capable of controlling the width between cutting blade 30 and guiding device 32, including, but not limited to, an adjustable screw 40.

Adjustable screw 40 may be included in woodturning tool 10 (see FIG. 3). Adjustable screw 40 may be adapted for controlling the distance between second end of first rigid arm 18 and second end of second rigid arm 24, which in turn, may control the width between cutting blade 30 and guiding device 32. Adjustable screw 40 may be threaded through either first rigid arm 14 or second rigid arm 20. Preferably, adjustable screw 40 may be threaded through second rigid arm 20.

Angle 42 may be included between second point 28 and second end of second rigid arm 24 (see FIG. 2). Angle 42 may be for allowing adjustable screw 40 to be perpendicular to first rigid arm 14 when cutting blade 30 and guiding device 32 may be at a set width 44.

Set width 44 may be any width between cutting blade 30 and guiding device 32. Preferably, set width 44 is the median or most common width needed for creating the side walls of container 12.

Second clearance distance 48 may be included in second rigid arm 20 (see FIG. 2). Second clearance distance 48 may be for allowing the necessary clearance from second rigid arm 20 when maneuvering guiding device 32 over the outer walls of container 12. Second clearance distance 48 may be any distance. Second clearance distance 48 may be the radius from approximately second point 28 to first end of second rigid arm 22.

Handle 36 may be included in woodturning tool 10 (see FIG. 1). Handle 36 may be for providing a surface for the operator to grip woodturning tool 10 for operation. Handle 36 may be attached to either second end of first rigid arm 18 or second end of second rigid arm 24. Preferably, handle 36 may be attached to second end of first rigid arm 18 to allow cutting blade 30 to be aligned with the longitudinal axis of woodturning tool 10. Handle 36 may be any handle. Handle 36 may be made out of any material, including, but not limited to, wood. Handle 36 may be attached to woodturning tool 10 by a set of knurls 50.

Knurls 50 may be included in woodturning tool 10 (see FIG. 3). Knurls 50 may be for gripping handle 36 and preventing handle 36 from rotating relative to woodturning tool 10. Knurls 50 may be any shape or size. Preferably, knurls 50 may be longitudinal to prevent handle 36 from twisting relative to woodturning tool 10.

Woodturning tool 10 may be used to create a number of different shapes and sizes of container 12. For smaller size containers where the interior is thinner and longer, like goblets (see FIG. 4), woodturning tool 10 may be designed with a shorter first clearance distance 46 and a shorter second clearance distance 48. This may allow woodturning tool 10 to access the interior of a smaller container 12.

Figure 4:
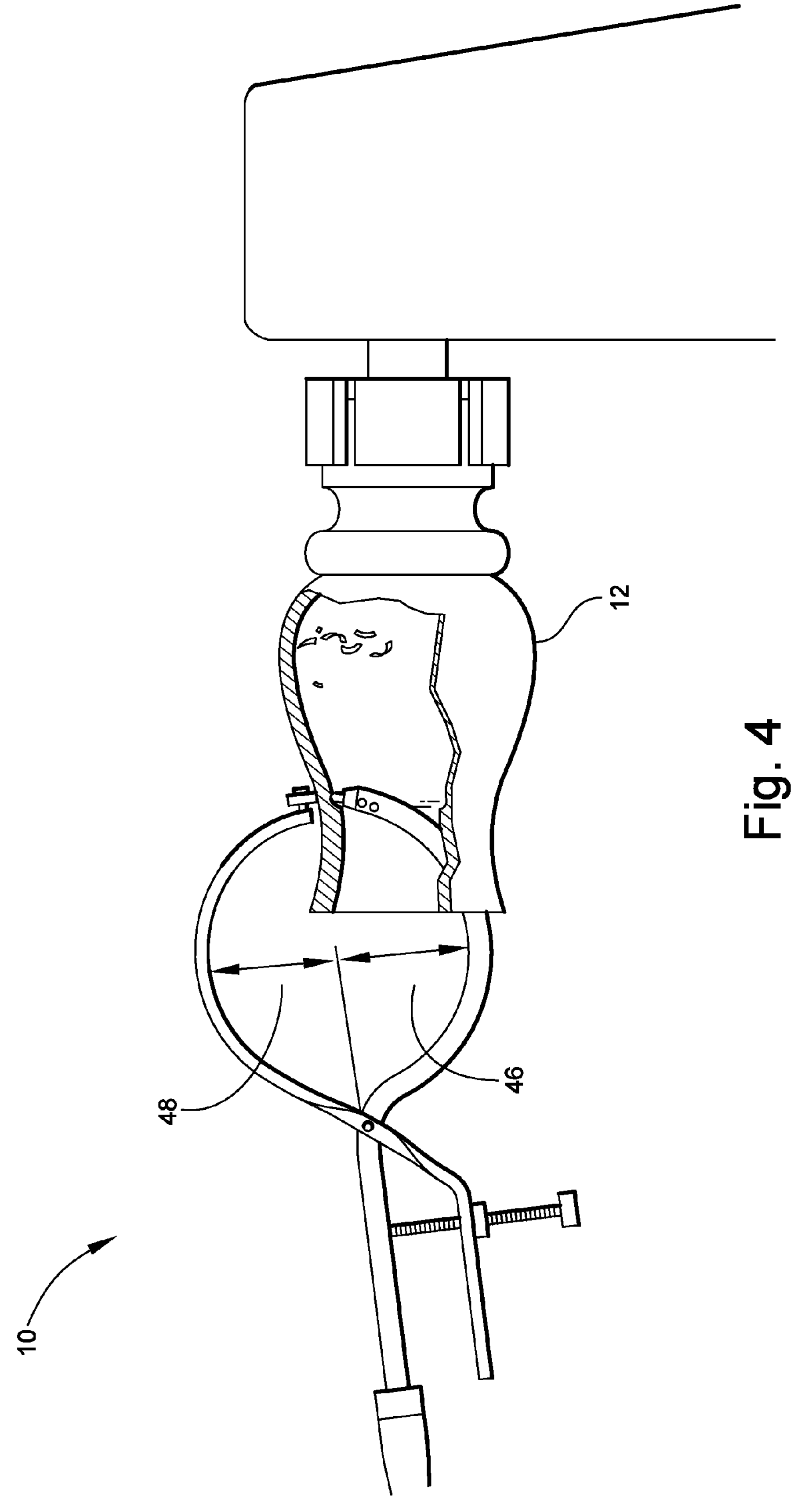
FIG. 4 is an environmental view of another embodiment of the wood turning tool.

In operation, woodturning tool 10 may be used for creating container 12 (see FIGS. 1 and 4). A turning blank, or block of wood, may first be mounted on the chuck of the lathe. Next the external cuts may be performed to shape the wood into the desired outer shape of container 12. Once the external shape is obtained, the inside may be removed with any conventional woodturning tools, i.e., gauges, scrapers, etc. This internal cut may remove enough material to allow woodturning tool 10 to be inserted into container 12. Preferably, this internal cut may remove enough of the inside to get the wall thickness of container 12 down to roughly one (1) inch thick. Once woodturning tool 10 may be inserted into container 12 (or the walls are roughly one (1) inch thick) woodturning tool 10 may be used for creating a uniform or controlled wall thickness in container 12.

The first step in using woodturning tool 10 is to adjust adjustable screw 40 to obtain the desired distance between cutting blade 30 and guiding device 32. Adjustable screw 40 may be adjusted so that the distance between cutting blade 30 and guiding device 32 may be slightly less than the current wall thickness. Woodturning tool 10 may then be opened by pivoting second rigid arm 20 relative to first rigid arm 14, like opening scissors. Woodturning tool 10 may be opened just far enough to fit the walls of container 12 in between cutting blade 30 and guiding device 32. Once opened, woodturning tool 10 may be inserted into container 12 for performing the first internal cut. Preferably, the first internal cut may start at the bottom of container 12, or the end closest to the chuck, and may work its way out to the top of container 12.

The internal cut may be performed by closing woodturning tool 10 like scissors, and holding the second ends together (as far as adjustable width device 34 may allow) while moving woodturning tool 10 over the walls of container 12. Preferably, a tool rest may be used for providing a surface for resting woodturning tool 10 on when woodturning tool 10 may be performing an internal cut. The tool rest may prevent woodturning tool 10 from rotating and may provide a leverage point for easier use.

When cutting, woodturning tool 10 may be maneuvered so that guiding device 32 may maintain constant contact with the outer wall of container 12. When moving guiding device 32 over the exterior walls, because of first clearance distance 46 and second clearance distance 48, roller bearing 38 may be maintained perpendicular to the exterior walls of container 12 at all times. This may allow cutting blade 30 to mirror the outer walls of container 12 and provide a uniform or controlled wall thickness when making the internal cut.

After the first internal cut is performed, adjustable screw 40 may be adjusted to make the distance between cutting blade 30 and guiding device 32 smaller. A second cut may be performed just like the initial cut to make the walls of container 12 thinner. This process may be repeated several times until the desired wall thickness may be achieved.

Woodturning tool 10 may allow for a controlled or a uniform wall thickness in container 12. To create a uniform wall thickness, each internal cut may be performed along the entire interior of container 12. To create a controlled wall thickness, i.e. a tapered wall, the internal cut may be performed on partial sections (depending on where the walls are to be tapered). Or in the alternative, adjustable screw 40 may be adjusted during operation to control the creation of the tapered walls.

Once the desired wall thickness may be achieved, container 12 may be finished. This process may include sanding, curing, staining, painting, etc.

Because the wall thickness of container 12 may be uniform or controlled with woodturning tool 10, the time it takes for the process of curing may be reduced, the strength of container 12 may be increased, and the aesthetic appearance of the container may be increased.

The present invention may be embodied in other forms without departing from the spirit and the essential attributes thereof, and, accordingly, reference should be made to the appended claims, rather than to the foregoing specification, as indicated in the scope of the invention.

I claim:

1. A woodturning tool for creating containers comprising:

a first rigid arm with two ends having a cutting blade at the first end; and a second rigid arm with two ends having a guiding device at the first end;

said first rigid arm being pivotally connected at a first point to said second rigid arm at a second point;

said first point being between the ends of said first rigid arm;

said second point being between the two ends of said second rigid arm;

said cutting blade and said guiding device being operatively aligned; and said first and second arms being adapted to move relative to one another.

2. The woodturning tool of claim 1 further comprising an adjustable width device adapted to control how close said cutting blade may move toward said guiding device.

3. The woodturning tool of claim 2 where said adjustable width device being an adjustable screw through one of said rigid arms adapted to control how close said second ends come together.

4. The woodturning tool of claim 3 where said adjustable screw being threaded through said second rigid arm between said second point and said second end.

5. The woodturning tool of claim 4 where said second rigid arm having an angle adapted to make said adjustable screw approximately perpendicular with said first rigid arm when said cutting blade and said guiding device being a set width apart.

6. The woodturning tool of claim 1 where said first rigid arm having a first clearance distance from approximate said first point to said first end.

7. The woodturning tool of claim 1 where said second rigid arm having a second clearance distance from approximate said second point to said first end.

8. The wood turning tool of claim 1 where said first rigid arm having a circular cross section.

9. The wood turning tool of claim 1 where said second rigid arm having a rectangular cross section.

10. The woodturning tool of claim 1 where said guiding device being a roller bearing.

11. The woodturning tool of claim 1 where said cutting blade being aligned with the longitudinal axis of the woodturning tool.

12. The woodturning tool of claim 1 further comprising a handle being attached to the second ends of one of said rigid arms.

13. The woodturning tool of claim 12 where said handle being connected to the second end of said first rigid arm.

14. The woodturning tool of claim 13 where said handle being connected to said first arm by a set of knurls.

15. The woodturning tool of claim 13 where said handle being made of wood.

16. A woodturning tool for creating containers comprising:

a first rigid arm of a circular cross section having two ends with a cutting blade at the first end and a handle connected by longitudinal knurls at the second end;

said cutting blade being aligned with the longitudinal axis of the woodturning tool;

a second rigid arm of a rectangular cross section having two ends with a guiding device at the first end;

said cutting blade and said guiding device being operatively aligned. said first rigid arm being pivotally connected at a first point between said two ends to said second rigid arm at a second point between said two ends;

an adjustable screw threaded through said second rigid arm between said second point and the second end adapted to control how close said cutting blade pivots toward said guiding device;

a first clearance distance in said first rigid arm from approximate said first point to said first end;

a second clearance distance in said second rigid arm from approximate said second point to said second end; and an angle of said second rigid arm between said second point and the second end adapted to make said adjustable screw approximately perpendicular with said first rigid arm when said cutting blade and said guiding device being a set width apart.

17. A woodturning tool for creating containers comprising:

a first rigid arm with two ends having a cutting blade at the first end;

a second rigid arm with two ends having a guiding device at the first end;

said cutting blade and said guiding device being operatively aligned;

said first and second arms being adapted to move relative to one another; and an adjustable width device adapted to control how close said cutting blade may move toward said guiding device, said adjustable width device being an adjustable screw through one of said rigid arms adapted to control how close said second ends come together, said adjustable screw being threaded through said second rigid arm.

18. The woodturning tool of claim 17 where said second rigid arm having an angle adapted to make said adjustable screw approximately perpendicular with said first rigid arm when said cutting blade and said guiding device being a set width apart.

19. The woodturning tool of claim 1 where said first rigid arm having a first clearance distance from approximate said first point to said first end and said second rigid arm having a second clearance distance from approximate said second point to said first end.

20. The woodturning tool of claim 17 where said cutting blade being aligned with the longitudinal axis of the woodturning tool.

* * * * *